United States Patent [19]

Müller et al.

[11] Patent Number: 5,348,575
[45] Date of Patent: Sep. 20, 1994

[54] CORROSION PROTECTION COMPOSITION FOR METAL WORKPIECES

[75] Inventors: Hans-Joachim Müller, Remscheid; Hans-Wilhelm Plankert, Leverkusen, both of Fed. Rep. of Germany

[73] Assignee: Goetz E. AG, Burscheid, Fed. Rep. of Germany

[21] Appl. No.: 88,549

[22] Filed: Jul. 9, 1993

[30] Foreign Application Priority Data

Jul. 11, 1992 [DE] Fed. Rep. of Germany ....... 4222894

[51] Int. Cl.$^5$ .............................................. C09D 5/08
[52] U.S. Cl. ................... 106/14.35; 106/14.34; 106/271; 106/272; 427/384
[58] Field of Search ............... 106/14.34, 14.35, 271, 106/272; 427/384

[56] References Cited

U.S. PATENT DOCUMENTS

| | | | |
|---|---|---|---|
| 2,471,889 | 5/1949 | Paliwoda et al. | 106/14.35 |
| 2,716,611 | 8/1955 | Paxton | 106/14.35 |
| 2,871,136 | 1/1959 | Eckhardt et al. | 106/14.34 |
| 2,995,532 | 8/1961 | Cantrell et al. | 106/14.34 |
| 3,647,730 | 3/1972 | Rott et al. | 260/23 R |
| 4,183,757 | 1/1980 | Groszek et al. | 106/14.34 |
| 4,356,036 | 10/1982 | Kaliardos | 106/14.34 |
| 4,444,802 | 4/1984 | Winters et al. | 106/14.34 |
| 4,479,981 | 10/1984 | Winters et al. | 106/14.34 |
| 4,752,336 | 6/1988 | Figiel | 106/14.23 |
| 4,851,043 | 7/1989 | Dotson et al. | 106/14.34 |
| 4,946,503 | 8/1990 | Hattori et al. | 106/14.35 |
| 5,074,913 | 12/1991 | Trivett | 106/14.35 |
| 5,106,415 | 4/1992 | Davidian | 106/14.34 |

FOREIGN PATENT DOCUMENTS

| | | |
|---|---|---|
| 0122762 | 10/1984 | European Pat. Off. . |
| 0363824 | 4/1990 | European Pat. Off. . |
| 717967 | 2/1942 | Fed. Rep. of Germany . |
| 1227592 | 10/1966 | Fed. Rep. of Germany ... 106/14.35 |
| 3341121 | 5/1984 | Fed. Rep. of Germany . |
| 1500947 | 11/1967 | France . |
| 63-284274 | 11/1988 | Japan ................................. 106/14.35 |
| 727018 | 3/1955 | United Kingdom ............. 106/14.34 |
| 92012215 | 7/1992 | World Int. Prop. O. .......... 106/822 |

*Primary Examiner*—Anthony Green
*Attorney, Agent, or Firm*—Spencer, Frank & Scheider

[57] ABSTRACT

A corrosion protection composition that is advantageously unobjectionable from a health risk point of view and not easily flammable, for the economic production of anticorrosion coatings on metal workpieces, in particular, workpieces made of cast iron or steel, for the period of their storage and transport until the workpieces are installed, is composed of a solution of a mineral wax mixture in a liquid monocarboxylic acid ester. The composition includes from about 5 to about 10 parts by weight of a mineral wax mixture which has a molecular weight ranging between about 400 and about 600, and from about 70 to about 85 parts by weight of at least one liquid monocarboxylic acid ester which has a boiling point above 340° C., and, optionally, additives such as antioxidants, antiozonants, antiaging agents, corrosion inhibitors, light stabilizers, and/or wetting agents. The corrosion protection composition, when heated, forms a clear, low-viscosity solution and, after being applied to the workpiece and cooled, forms a coating having viscous consistency which ranges from salve-like to pasty. The coatings are well suited to provide corrosion protection for, for example, piston rings or other sealing rings for internal-combustion engines.

11 Claims, No Drawings

CORROSION PROTECTION COMPOSITION FOR METAL WORKPIECES

CROSS-REFERENCE TO RELATED APPLICATION

This application claims the priority of application Ser. No. P 42 22 894.8 filed Jul. 11, 1992 in Germany, the subject matter of which is incorporated herein by reference.

BACKGROUND OF THE INVENTION

1. Field of The Invention

The present invention relates to a corrosion protection composition for the production of anticorrosion coatings on metal workpieces for storage until installation, the composition being based on a wax that is dissolved in a solvent.

2. Description of The Related Art

Corrosion protection compositions used for the production of anticorrosion coatings on metal workpieces are used, in practice, primarily for the time period between their manufacture and their installation. Such compositions are preferably composed of mineral waxes or fats that are dissolved in highly volatile solvents. The metal workpieces, after manufacture, are dipped into the corrosion protection solution and the highly volatile solvent(s) evaporated to form a protective coating on the workpieces. Then, if necessary, the coatings may be removed before installation of the workpiece, for example, by dissolving them away, washing them off, or melting them off.

According to its intended use, the corrosion protection composition should wet the workpiece, which may have a very complicated geometrical structure, so as to form the most uniform possible, thick coating layer. This helps insure that the corrosion protection properties of the coating are sufficient to last over long periods of time during storage of the workpiece. The coating must adhere well to the workpiece; it must not stick to other workpieces or the workpiece's packaging; it must not soak into the packaging material; and, when the workpiece is installed, there must be no chemical reaction with the installed partners, i.e., mating structures.

The conventional, highly volatile solvents used in such corrosion protection compositions are chlorinated hydrocarbons, such as trichloroethylene or perchloroethylene which, although easily managed because they are non-combustible liquids, are a health risk and, according to present rules and regulations, can be employed only with costly and extensive protective measures.

For example, European Patent 0,122,762, teaches a wax-containing corrosion protection composition dissolved in a solvent composed of a mixture of petroleum and aromatic hydrocarbons. Aromatic hydrocarbons, however, also present a considerable health risk so that these corrosion protection compositions must also be employed with costly and extensive protective measures and, in addition, other expensive safety measures are necessitated by the combustibility of these solvents.

Originally, as disclosed, for example, in German Patent 717,967, mineral fats, vaseline, paraffins or waxes were melted to form "hot fat" immersion baths and were employed directly to produce anticorrosion coatings. An anticorrosion coating was produced by dipping the workpieces directly into the melt. Handling of such hot fat immersion baths is a difficult operation, however. Moreover, prolonged heating of such melt baths causes oxidation products to be formed from the substances employed including aggressive oxidation products whose vapors are basically just as harmful as certain solvent vapors. Finally, the substances become useless over the course of time. Moreover, the resulting coatings frequently do not have the required operational characteristics. They became too viscous or thick and chipped off due to lack of adhesion and as a result of brittleness.

It is therefore an object of the present invention to provide a corrosion protection composition based on a solution of wax in a solvent which, while easily handled, produces anticorrosion coatings on metal workpieces made of, for example, cast iron or steel, that have desirable operational characteristics and provide corrosion protection for the workpieces during storage until installation without presenting a health risk.

SUMMARY OF THE INVENTION

These and other objects are accomplished, according to the invention, by providing a corrosion protection composition for the production of anticorrosion coatings on metal workpieces for storage until they are installed, comprising from about 5 to about 10 parts by weight of a mineral wax mixture containing n-paraffins and iso-paraffins, the mineral wax mixture having an average molecular weight ranging between about 400 to about 600, a solidification point ranging between about 60° C. to about 70° C., and a ratio of n-paraffins to iso-paraffins ranging from 0.5:2 to 2:0.5; and from about 70 to about 85 parts by weight of at least one liquid monocarboxylic acid ester having a boiling point above about 340° C., a flash point above about 180° C. and a density ranging from about 0.8 to about 0.9 c/cm$^3$, wherein the corrosion protection composition is a solution of the mineral wax mixture in the liquid monocarboxylic acid ester.

Examples of liquid monocarboxylic acid esters useful in the invention include, but are not limited to, those prepared from long-chained fatty acids having from about 8 to about 20 carbon atoms and monovalent alcohols having from about 4 to about 10 carbon atoms. Methods for preparing such esters are well known in the art. Preferred fatty acids include stearic acid, palmitic acid, and oleic acid. Preferred alcohols include the range of butyl alcohol, iso- or n-, to octyl alcohol.

Preferred monocarboxylic acid esters for the practice of the invention include butyl stearate and butyl oleate. Butyl stearate has a boiling point of about 340° C. and butyl oleate has a boiling point of about 350° C. Also preferred are the monocarboxylic acid ester described in U.S. Pat. No. 3,647,730 to Rott et al., the disclosure of which is incorporated herein by reference. Most preferred are monocarboxylic acid esters having essentially uniform structures and well defined boiling points.

To produce the corrosion protection composition according to the invention, a weighed amount of at least one monocarboxylic acid ester is heated and a weighed amount of the mineral wax mixture is dissolved in the heated ester resulting in a clear, low-viscosity solution having approximately the viscosity of the monocarboxylic acid ester. After cooling, a solidified, soft product results which has a viscous consistency ranging from salve-like to pasty. The good retention capability of the mineral wax mixture causes the monocarboxylic acid ester to be bound to the wax mixture without there being any bleeding (demixing) of the monocarboxylic acid ester even after long periods of storage or during transport.

To produce anticorrosion coatings by immersion of the workpieces, the corrosion protection composition is melted in a container to provide a hot immersion bath maintained at temperatures around the melting point of the waxes employed. This suffices to maintain the corrosion protection composition as a clear, low-viscosity liquid suitable for immersion therein of workpieces. The invention uses a high boiling point, monocarboxylic acid ester so that substantially no low boiling point substances exist in the corrosion protection composition. Thus, advantageously, no harmful vapors develop and no concomitant thickening and resinification of the melt occurs. Moreover, at these temperatures, the corrosion protection composition is substantially insensitive to oxidation so that no harmful oxidation products develop and no aging phenomena are observed.

The liquid, corrosion protection composition produced by heating, moreover, has a low viscosity and a low surface tension so that, advantageously, the immersed metal workpieces are wetted uniformly even if they have a complicated geometrical structure.

After the workpieces are pulled out of the melt, the excess liquid allowed to drip off, and cooled, the workpieces are enveloped in a uniformly thick, viscous coating that seals each workpiece over its entire surface area and thus protects it against extraneous corroding influences. The resulting coating is fast to handling and adheres well to the workpiece so that it is not damaged even after prolonged periods of storage or when handled. Thus, the entire surface of the workpiece remains advantageously protected against corrosion.

Wetting, i.e., bleeding of liquid, does not occur even after prolonged periods of storage so that packaged workpieces do not become surrounded by wet and thus damage any wrapping paper employed. The coatings produced according to the invention, moreover, are not sticky. The workpieces do not stick to the packaging material or to one another so that it is easy to unpack them to process them individually, particularly employing fully automated processing.

If necessary, the coatings may be removed before installation of the workpieces by simple means, such as by dissolving them away, washing them off with hot water, or treating them with steam.

To improve its anticorrosion effect and to improve its durability, the corrosion protection composition may include at least one additive, such as antioxidants, antiozonants, antiaging agents, light stabilizers and/or wetting agents. Such additives are known per se and need not be discussed here. Preferably employed are additives based an alkanolamides, sulfonates and/or phosphoric acid esters which are dissolved in mineral oil and added to the corrosion protection compositions in quantities totalling collectively from about 0.001 up to about 15 parts by weight.

Preferred for this purpose are solutions of from about 85 to about 95% additive(s) in a solvent comprised of from about 0.001 up to about 8.5% of mineral oil, with care being taking that the total mineral oil content in the corrosion protection composition does not lie above about 1.5%. Thus, preferably the solution does not exceed about 8.5% mineral oil. Then, the corrosion protection composition according to the invention will not contain any significant percentages of highly volatile and/or oxidizing and resin forming components and the corrosion protection composition can be employed as a melt in a hot immersion bath for long periods of time without changing its properties.

The present invention thus makes available a corrosion protection composition for the production of anticorrosion coatings on metal workpieces. Due to its being unobjectionable from a health risk point of view and its poor flammability and good stability values, this coating can be used without problems and thus economically, particularly in mass production. The resulting coatings are well suited to provide corrosion protection to metal workpieces and their durability is sufficient for uses customary in practice.

Preferably, the corrosion protection compositions according to the invention are employed to protect small components made of cast iron or steel, such as, in particular, piston rings or other sealing components for internal-combustion engines, against corrosion between manufacture and installation.

However, the corrosion protection composition of the present invention can also be employed for other workpieces of larger size, for example, tools or other machine components. The workpieces may also be made of non-ferrous metals and their alloys. Preferably, however, the corrosion protection composition according to the present invention is employed to protect mass-produced workpieces.

If necessary, however, individual parts or larger, bulky workpieces and, possibly also, completely assembled devices or machines, may also be treated with the corrosion protection composition according to the invention. If required, the corrosion protection composition may be alternatively applied by other methods, for example, by spraying or painting, or rolling on.

It is understood that various other modifications will be apparent to and can be readily made by those skilled in the art without departing from the scope and spirit of the present invention. Accordingly, it is not intended that the scope of the claims appended hereto be limited to the description set forth above but rather that the claims be construed as encompassing all of the features of patentable novelty which reside in the present invention, including all features which would be treated as equivalents thereof by those skilled in the art to which the invention pertains.

What is claimed is:

1. A corrosion protection composition for the production of anticorrosion coatings on metal workpieces for storage until the metal workpieces are installed, comprising:
   a. from about 5 to about 10 parts by weight of a mineral wax mixture containing n-paraffins and iso-paraffins, the mineral wax mixture having an average molecular weight ranging between about 400 to about 600, a solidification point ranging between about 60° C. to about 70° C., and a ratio of n-paraffins to iso-paraffins ranging from 0.5:2 to 2:0.5; and
   b. from about 70 to about 85 parts by weight of at least one liquid monocarboxylic acid ester having a boiling point above about 340° C., a flash point above 180° C. and a density ranging from about 0.8 to about 0.9 c/cm$^3$,
   wherein the corrosion protection composition is a solution of the mineral wax mixture in the at least one liquid monocarboxylic acid ester.

2. The corrosion protection composition as defined in claim 1, wherein the at least one liquid monocarboxylic acid ester employed has an essentially uniform chemical structure and a defined boiling point.

3. The corrosion protection composition as defined in claim 2, further comprising at least one additive which is an antioxidant, antiozonant, antiaging agent, corrosion inhibitor, light stabilizer or wetting agent.

4. The corrosion protection composition as defined in claim 3, wherein the at least one additive is selected from the group consisting of alkanolamides, sulfonates and phosphoric acid esters.

5. The corrosion protection composition as defined in claim 4, wherein from about 0.001 to about 15 parts by weight of the at least one additive is added to the corrosion protection composition as a solution in up to about 8.5% mineral oil, with the mineral oil content in the corrosion protection composition not exceeding about 1.5 parts by weight.

6. The corrosion protection composition as defined in claim 1, further comprising at least one additive which is an antioxidant, antiozonant, antiaging agent, corrosion inhibitor, light stabilizer or wetting agent.

7. The corrosion protection composition as defined in claim 6, wherein the at least one additive is selected from the group consisting of alkanolamides, sulfonates and phosphoric acid esters.

8. The corrosion protection composition as defined in claim 7, wherein the at least one additive is added to the corrosion protection composition as a solution of from about 0.001 to about 15 parts by weight of the at least one additive in a solvent comprised of from about 0,001% to about 8.5% mineral oil, with the mineral oil content in the corrosion protection composition not exceeding about 1.5 parts by weight.

9. The corrosion protection composition as defined in claim 1, wherein the at least one liquid monocarboxylic acid ester is prepared from at least one long-chain fatty acid having from about 8 to about 20 carbon atoms and at least one monovalent alcohol having from about 4 to about 10 carbon atoms.

10. The process of protecting a metal workpiece from corrosion during storage and transport until installation of the metal workpiece, comprising:
   providing a corrosion protection composition as defined in claim 1; and
   coating the metal workpiece with the corrosion protection composition to provide a protective coating thereon which is effective to protect the metal workpiece from corrosion during storage and transport until installation of the metal workpiece.

11. The process according to claim 10, wherein the metal workpiece is made of one of ast iron or steel.

* * * * *

UNITED STATES PATENT AND TRADEMARK OFFICE
CERTIFICATE OF CORRECTION

PATENT NO. : 5,348,575
DATED : September 20, 1994
INVENTOR(S) : MÜLLER et al.

It is certified that error appears in the above-indentified patent and that said Letters Patent is hereby corrected as shown below:

On the title page, item

[73] Assignee: Change "Goetz E. AG" to read --GOETZE AG--.

Signed and Sealed this

Sixth Day of December, 1994

Attest:

BRUCE LEHMAN

Attesting Officer    Commissioner of Patents and Trademarks